US010832399B2

(12) United States Patent
Huang et al.

(10) Patent No.: US 10,832,399 B2
(45) Date of Patent: Nov. 10, 2020

(54) DETECTION FOR ABNORMAL CONNECTIVITY ON A PRODUCT

(71) Applicant: INTERNATIONAL BUSINESS MACHINES CORPORATION, Armonk, NY (US)

(72) Inventors: Jing Chang Huang, Shanghai (CN); Jun Zhu, Shanghai (CN); Guo Qiang Hu, Shanghai (CN); Peng Ji, Nanjing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 143 days.

(21) Appl. No.: 16/167,689

(22) Filed: Oct. 23, 2018

(65) Prior Publication Data
US 2020/0126202 A1 Apr. 23, 2020

(51) Int. Cl.
*G06K 9/00* (2006.01)
*G06T 7/00* (2017.01)
*G06T 7/90* (2017.01)

(52) U.S. Cl.
CPC ............. *G06T 7/001* (2013.01); *G06T 7/90* (2017.01); *G06T 2207/20224* (2013.01); *G06T 2207/30121* (2013.01)

(58) Field of Classification Search
CPC .. G06T 7/00; G06T 7/90; G06T 7/001; G06T 2207/20224; G06T 2207/30121;
(Continued)

(56) References Cited

U.S. PATENT DOCUMENTS 6,493,079 B1 * 12/2002 Piacentini .............. G06K 9/209
356/240.1
6,539,106 B1 * 3/2003 Gallarda .............. G01R 31/307
382/149
(Continued)

FOREIGN PATENT DOCUMENTS

CN 108335294 A * 7/2018
JP 58068630 A * 4/1983 ........... G01N 21/956
(Continued)

OTHER PUBLICATIONS

Kim, S. et al., "Automatic Defect Detection from SEM Images of Wafers using Component Tree" Journal of Semiconductor Technology and Science (Feb. 2017) pp. 86-93, vol. 17, No. 1.
(Continued)

*Primary Examiner* — Mahendra R Patel
(74) *Attorney, Agent, or Firm* — Tutunjian & Bitetto, P.C.; Joseph Petrokaitis (57) ABSTRACT

Methods and systems for detecting abnormal connectivity on a product are provided. The methods receive an inspection image of the product including a defect, match the inspection image with a template image of the product to locate a corresponding normal region in the template image and obtain a differential image between the inspection image and the normal region. The method further includes forming a regional mask image from component masks. Each of the component masks includes a binary image of the template image with only one kind of components of the product remaining. The regional mask image is a region in its corresponding component mask that corresponds to the normal region. The method further includes determining, based on a calculation using the differential image and the at least one regional mask image, at least one of: connectivity
(Continued)

relationship, connectivity type and connectivity scale of abnormal connectivity on the product.

20 Claims, 7 Drawing Sheets (58) Field of Classification Search
CPC . G06T 2207/20081; G06T 2207/20072; G06T 2207/10061; G06T 2207/30148; G06T 2207/20076; G06N 5/003; G06N 20/00; G06N 3/08; B41J 29/393; H04N 7/18; H04L 29/06; H04L 63/1408; G06K 9/00; G06K 9/36; G06F 11/36; A61B 6/032; A61B 6/037
USPC .......................... 382/141, 147, 149; 717/131
See application file for complete search history.

(56) References Cited

U.S. PATENT DOCUMENTS

| | | | | |
|---|---|---|---|---|
| 6,868,176 | B2* | 3/2005 | Sugawara | G06K 9/3275 382/143 |
| 6,983,065 | B1* | 1/2006 | Akgul | G06K 9/4619 348/125 |
| 8,995,747 | B2* | 3/2015 | Xu | G06T 7/0008 382/149 |
| 9,595,091 | B2* | 3/2017 | Kaizerman | G06T 7/0004 |
| 9,731,500 | B2* | 8/2017 | Schumann | G06T 7/001 |
| 9,846,929 | B2* | 12/2017 | Zou | G06T 7/0004 |
| 10,043,257 | B2* | 8/2018 | Ladewig | G06K 9/6267 |
| 2003/0015659 | A1* | 1/2003 | Honda | G01N 23/225 250/306 |
| 2007/0201739 | A1* | 8/2007 | Nakagaki | G06T 7/001 382/149 |
| 2007/0288219 | A1* | 12/2007 | Zafar | G06T 7/0008 703/14 |
| 2009/0039263 | A1* | 2/2009 | Matsuoka | G06T 7/0006 250/311 |
| 2010/0111396 | A1* | 5/2010 | Boucheron | G06K 9/6231 382/133 |
| 2012/0249776 | A1* | 10/2012 | Ji | G01R 31/2635 348/125 |
| 2013/0279791 | A1* | 10/2013 | Kaizerman | G06T 7/0004 382/145 |
| 2014/0232773 | A1* | 8/2014 | Hamazaki | B41J 2/2139 347/14 |
| 2015/0234736 | A1* | 8/2015 | Koju | G06F 8/443 717/131 |
| 2016/0313651 | A1* | 10/2016 | Middlebrooks | G06F 30/367 |
| 2017/0294014 | A1* | 10/2017 | Nakano | G06N 3/04 |
| 2019/0163599 | A1* | 5/2019 | Breuer | G06F 11/3089 |
| 2019/0304092 | A1* | 10/2019 | Akselrod-Ballin | G06T 7/143 |

FOREIGN PATENT DOCUMENTS

| | | | | |
|---|---|---|---|---|
| KR | 20070002249 A | * | 1/2007 | |
| WO | WO-2013077381 A1 | * | 5/2013 | ......... A61B 1/00009 |
| WO | WO-2015090774 A1 | * | 6/2015 | ............ G03F 7/705 |

OTHER PUBLICATIONS

Liu, Y. et al., "Automatic Defect Detection for TFT-LCD Array Process Using Quasiconformal Kernel Support Vector Data Description" International Journal of Molecular Sciences (Dec. 2011) pp. 5762-5781, vol. 12, No. 9.

* cited by examiner

DETECTION FOR ABNORMAL CONNECTIVITY ON A PRODUCT

BACKGROUND

Technical Field

The present invention relates to product defect inspection, and more specifically, to a method, a system and a computer program product for detecting abnormal connectivity on a product.

Related Art

Nowadays, in many fields, especially in the manufacturing field, there is a fast-growing visual inspection automation demand. For example, when a smartphone part, a printed circuit board (PCB) product, a liquid crystal display (LCD) panel, or a storage device is manufactured, an image of the product may be captured and a defect inspection is performed on the captured image.

Taking LCD as an example, all LCD manufacturers expend effort to inspect their defective products, and nearly two thirds of human resources are invested in this area. This is because the inspection involves determination of abnormal connectivity state and a subsequent repair method depends on the abnormal connectivity state. The abnormal connectivity state involves the following aspects: connectivity relationship among a defect and the components in the product; connectivity type that indicates whether an open circuit or a short circuit is caused by the defect; and connectivity scale that indicates whether the connectivity is loose (just touched) or tight (e.g., an overlap of a defect and a component exceeds half the width of the component). Based on the abnormal connectivity state, a repair method is selected for the product. In one example, if the abnormal connectivity state shows the defect is fatal, the product might be discarded.

SUMMARY

A method, a system and a computer program product are provided for detecting abnormal connectivity on an electronic product.

According to one embodiment of the present invention, there is provided a method for detecting abnormal connectivity on a product. The method includes receiving an inspection image of the product including at least one defect. The method further includes matching the inspection image with a template image of the product to locate a corresponding normal region in the template image. The method further includes obtaining a differential image between the inspection image and the normal region. The method further includes forming at least one regional mask image from a plurality of component masks. Each of the plurality of component masks is a binary image of the template image with only one kind of components of the product remaining. The regional mask image is a region in its corresponding component mask that corresponds to the normal region. The method further includes determining, based on calculation using the differential image and the at least one regional mask image, at least one of: connectivity relationship, connectivity type and connectivity scale of abnormal connectivity on the product.

According to another embodiment of the present invention, there is provided a system for detecting abnormal connectivity on a product. The system includes one or more processors and a memory coupled to at least one of the one or more processors. The system includes a set of computer program instructions stored in the memory and executed by at least one of the one or more processors to perform action of receiving an inspection image of the product including at least one defect. The system further includes a set of computer program instructions stored in the memory and executed by at least one of the one or more processors to perform action of matching the inspection image with a template image of the product to locate a corresponding normal region in the template image. The system further includes a set of computer program instructions stored in the memory and executed by at least one of the one or more processors to perform action of obtaining a differential image between the inspection image and the normal region. The system further includes a set of computer program instructions stored in the memory and executed by at least one of the one or more processors to perform action of forming at least one regional mask image from a plurality of component masks. Each of the plurality of component masks is a binary image of the template image with only one kind of components of the product remained. The regional mask image is a region in its corresponding component mask that corresponds to the normal region. The system further includes a set of computer program instructions stored in the memory and executed by at least one of the one or more processors to perform action of determining, based on calculation using the differential image and the at least one regional mask image, at least one of: connectivity relationship, connectivity type and connectivity scale of abnormal connectivity on the product.

According to a further embodiment of the present invention, there is provided a computer program product for detecting abnormal connectivity on a product. The computer program product includes a computer readable storage medium having program instructions embodied therewith. The program instructions being executable by a device to cause the device to perform a method. The method includes receiving an inspection image of the product including at least one defect. The method further includes matching the inspection image with a template image of the product to locate a corresponding normal region in the template image. The method further includes obtaining a differential image between the inspection image and the normal region. The method further includes forming at least one regional mask image from a plurality of component masks. Each of the plurality of component masks is a binary image of the template image with only one kind of components of the product remaining. The regional mask image is a region in its corresponding component mask that corresponds to the normal region. The method further includes determining, based on calculation using the differential image and the at least one regional mask image, at least one of: connectivity relationship, connectivity type and connectivity scale of abnormal connectivity on the product.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

Figure 1:
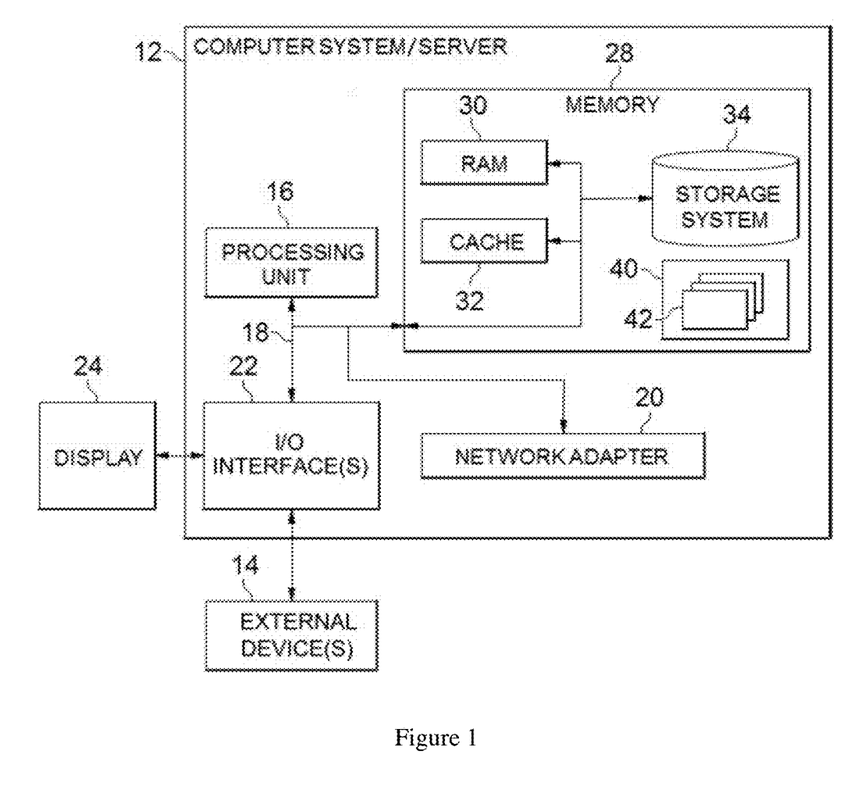
FIG. 1 shows an exemplary computer system which is applicable to implement the embodiments of the present invention.

Referring now to FIG. 1, in which an exemplary computer system/server 12 which is applicable to implement the embodiments of the present invention is shown. FIG. 1 is also adapted to depict an illustrative example of a portable electronic device such as a communication device which is applicable to implement the embodiments of the present invention. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 can include a variety of computer system readable media. Such media may be any available media that is accessible by computer system/server 12, and it includes both volatile and non-volatile media, removable and non-removable media.

System memory 28 can include computer system readable media in the form of volatile memory, such as random-access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Currently, to detect the abnormal connectivity state on a product, methods based on rules and methods based on machine learning are provided. Methods based on machine learning need manual labeling work such as labeling picture names, defect positions, topology relationships, defect types, defect scale, etc. In the methods based on rules, it needs to manually define many complicated rules for different products.

Figure 2:
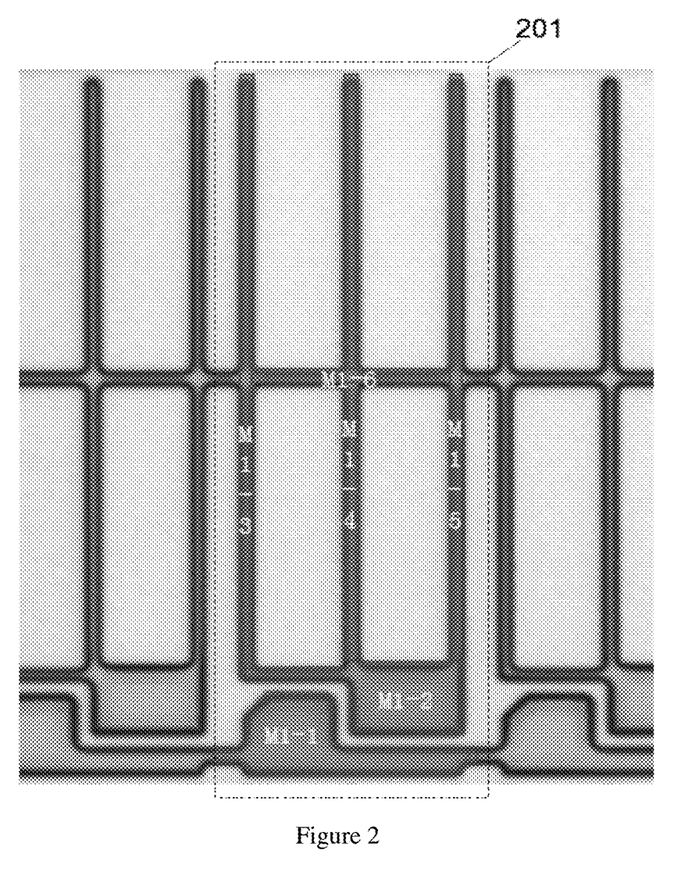
FIG. 2 shows an example of a layout of a single layer in a liquid crystal display (LCD) product under manufacturing.

For manufacturing of electronic products, especially for the LCD products, a LCD product may have many layers, and there are thousands of layouts for the layers in the LCD. Each layout has a unique topology, e.g., connectivity relationships among components. FIG. 2 shows an example of a layout of a single layer in a LCD product under manufacturing. In FIG. 2, it shows many cells in the visible layer, and each cell has the same layout and corresponds to a pixel of the LCD. A dotted rectangle 201 shows a single cell in which there are six components, i.e., M1-1 to M1-6. The six components have different shapes and some of them are connected to each other. The layout in FIG. 2 can be expressed by the following connectivity relationship table (Table 1), for example.

TABLE 1

|      | M1-1 | M1-2 | M1-3 | M1-4 | M1-5 | M1-6 |
|------|------|------|------|------|------|------|
| M1-1 |      |      |      |      |      |      |
| M1-2 |      |      | 1    | 1    | 1    |      |
| M1-3 |      | 1    |      |      |      | 1    |
| M1-4 |      | 1    |      |      |      | 1    |
| M1-5 |      | 1    |      |      |      | 1    |
| M1-6 |      |      | 1    | 1    | 1    |      |

In Table 1, if two components are connected to each other, cells in Table 1 with a row label and a column label named by the two components are set to 1. For example, since M1-3 is connected with M1-6 in FIG. 2, the cell (M1-3, M1-6) and the cell (M1-6, M1-3) are set to 1. For other components in FIG. 2, the same rule applies. Thus, Table 1 exactly reflects and records topology of the components in a cell in FIG. 2. Though Table 1 is explained based on cell 201 in FIG. 2, since all the cells in FIG. 2 have the same layout, the topology in Table 1 also applies to other cells in FIG. 2. In another embodiment of the present invention, cells in a layer of the product may have different layouts.

Considering there are thousands of layouts to be inspected for a manufacturer, if the methods based on rules are used, for different LCDs, storage devices or other products with diversified layouts, the layouts need to define many complicated rules, which involve a significant amount of work. Additionally, these defined rules can hardly be reused for new products. If the methods based on machine learning are used, since different LCDs, storage devices or other products may have diverse layouts, many models need to be created to deal with them. Additionally, the inventors of the present invention found that the machine learning method applied in the field achieves a poor accuracy.

Based on the above facts, in a current production environment, there are no efficient automation methods to perform the inspection on products, except for human eye observation. However, since sometimes a defect in the captured image has a small size such as 3×3 pixels, it is hard for a human to identify the defect. Additionally, as stated above, determining the abnormal connectivity state involves a plurality of tasks. It needs to determine connectivity relationships among a defect and the components in the product, which relates to a detection task; determine connectivity type (open circuit or short circuit), which relates to a classification task; and determine connectivity scale (scale of opening in a component or cross between components), which relates to a measurement task. It can be seen that, the inspection involves a multi-task issue. Therefore, human eye observation is quite time-consuming, unstable in quality and has no quantified standard.

The inventors of the present invention provide a defect inspection method performed on the captured image of a product automatically. This automatic inspection converts a multi-task issue into a topology relationship detection issue, which will improve efficiency of the inspection.

Figure 3:
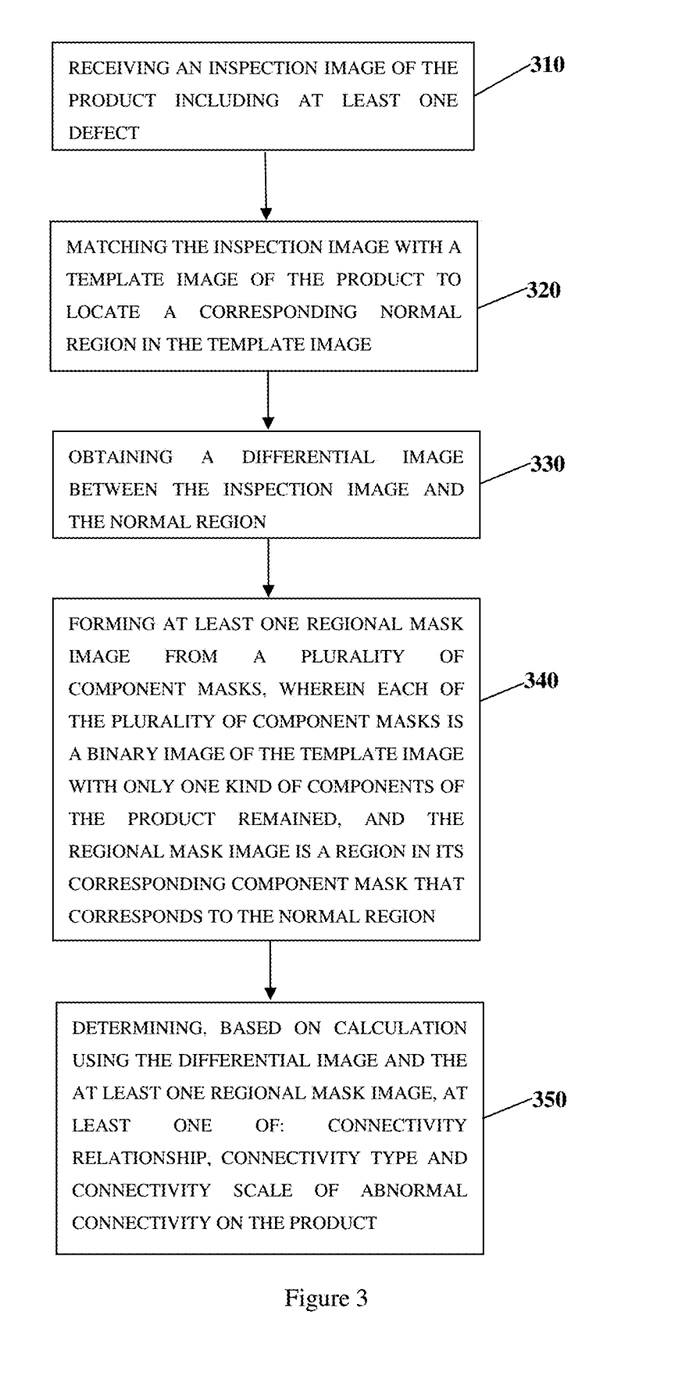
FIG. 3 is a flowchart illustrating a method for detecting abnormal connectivity on a product according to an embodiment of the present invention.

With reference now to FIG. 3, FIG. 3 is a flowchart illustrating a method for detecting abnormal connectivity on a product according to an embodiment of the present invention. As shown in FIG. 3, the method for detecting abnormal connectivity on a product includes an inspection image receiving step 310, a template matching step 320, a differential image obtaining step 330, a reginal mask image forming step 340, and an abnormal connectivity determining step 350. In one embodiment of the invention, the method in FIG. 3 may be performed in the computer system/server 12 in FIG. 1.

Figure 4A:
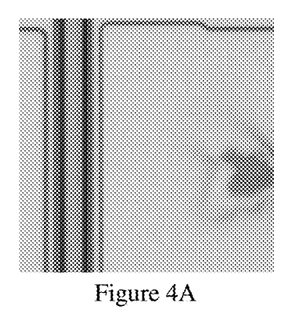
FIG. 4A shows an example of a received inspection image in which a defect (shown by the abnormal color lump) can be seen.

Specifically, in the inspection image receiving step 310, an inspection image of the product including at least one defect is received. The inspection image is a ROI (region of interest) region cut from a captured image of the whole product. This inspection image has been determined to include at least one defect in a preceding image processing procedure. FIG. 4A shows an example of a received inspection image in which a defect (shown by the abnormal color lump) can be seen. As to whether the at least one defect causes any abnormal connectivity, it is for the method in FIG. 3 to determine. In one embodiment of the invention, the method in FIG. 3 may be performed to each of the inspection images.

Figure 4B:
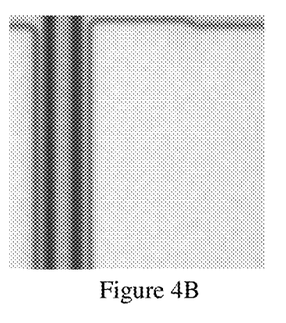
FIG. 4B shows an example of a matched normal region from a template image.
Figure 5A:
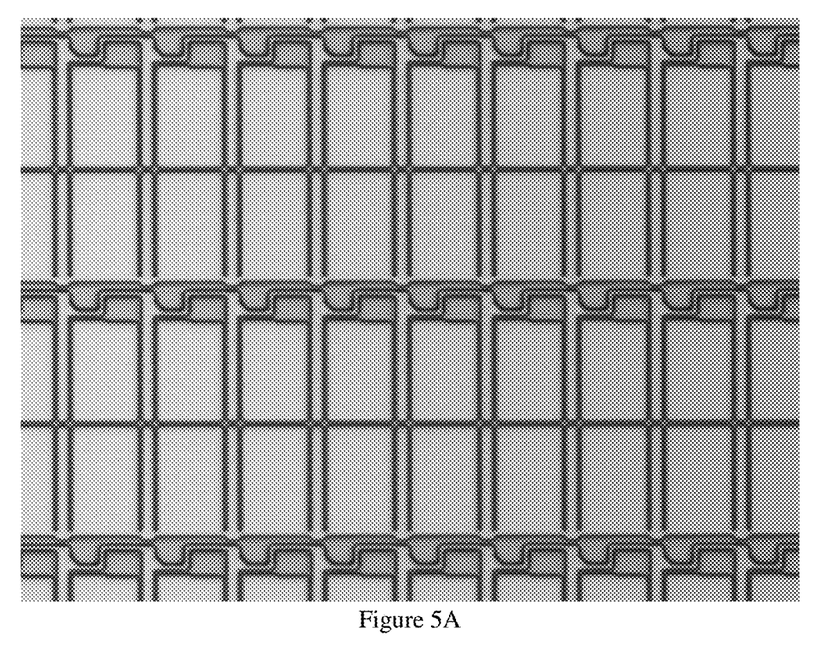
FIG. 5A shows an example of a template image of a LCD product in which a plurality of pixels is displayed.

Next, in the template matching step 320, the inspection image is matched with a template image of the product to locate a corresponding normal region in the template image. The template image is an image of the product (or of at least the part of the product that needs to be inspected) without any defects. That is, the template image is an image of a normal product. FIG. 5A shows an example of a template image of a LCD product in which a plurality of pixels is displayed. In one embodiment, the pixels in the template image have the same layout, so the matching in step 320 includes matching the inspection image with any of the pixels in the template image to locate a relative ROI region in the pixel. FIG. 4B shows an example of a matched normal region from the template image, which corresponds to the inspection image and has no defects. The matching may be performed using a known image matching algorithm, such as relation-based matching algorithm, feature-based matching algorithm, gray level-based algorithm, etc.

Figure 4C:
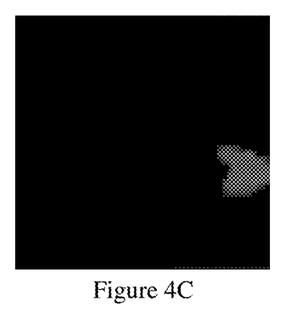
FIG. 4C shows an example of a differential image obtained by performing a subtraction operation between the images in FIGS. 4A and 4B.

After obtaining the relative ROI region (the corresponding normal region) from the template image, the method in FIG. 3 proceeds to step 330. In the differential image obtaining step 330, a differential image between the inspection image and the normal region is obtained. In one embodiment of the present invention, the differential image is obtained by subtracting the inspection image from the corresponding normal region on a pixel-by-pixel basis. For two corresponding pixels in the inspection image and the corresponding normal region, if they do not relate to the defect, they will have the same color and the difference between them will be zero. Thus, the corresponding pixel in the differential image will be black. On the other hand, if the two corresponding pixels in the inspection image and the corresponding normal region relate to the defect, they will have different colors and the difference between them will be non-zero. Thus, the corresponding pixel in the differential image will not be black. FIG. 4C shows an example of a differential image obtained by performing a subtraction operation between the images in FIGS. 4A and 4B.

In FIG. 4C, the color lump representing the defect is shown in gray. In one embodiment of the present invention, the differential image may be a binary image. That is, pixels of the differential image have only two colors. One color represents the pixel is normal, and the other color represents the pixel relates to a defect. In another embodiment of the present invention, the differential image is obtained by subtracting the inspection image from the corresponding normal region on a pixel-by-pixel basis and converting it to a black and white image, which is also a binary image. Here, non-black pixels in the result of the subtraction operation may be replaced by white pixels. For the example in FIG. 4C, pixels in the gray color lump can be replaced by white pixels. In this way, the subsequent calculation can be easier.

Figure 5B:
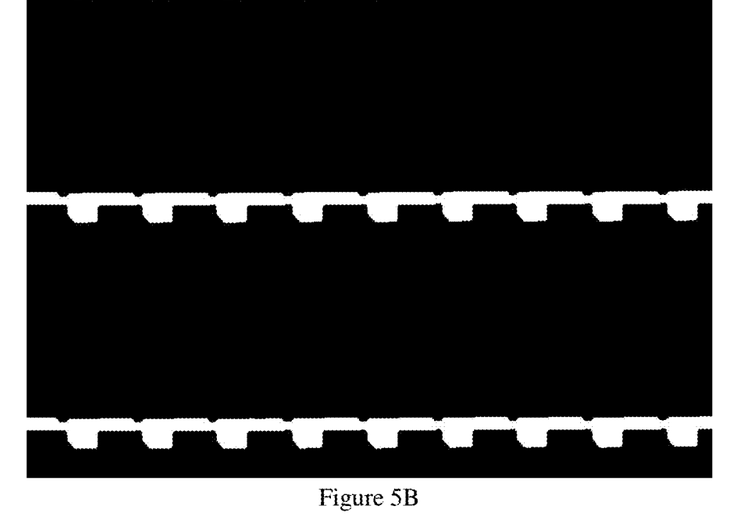
FIG. 5B shows an example of a component mask of the template image in FIG. 5A.

Next, in the regional mask image forming step 340, at least one regional mask image is formed from a plurality of component masks. In one embodiment of the present invention, a topology relationship library is created in advance based on the template image. The topology relationship library includes a plurality of component masks, each of the plurality of component masks is a binary image of the template image with only one kind of components of the product remained. FIG. 5B shows an example of a component mask of the template image in FIG. 5A. The component mask is a binary image of the template image, but it includes only one kind of components in the template image. For other kinds of components, they are located in other component masks, and each of the component masks includes different kinds of components. For the sake of simplicity, component masks other than the one in FIG. 5B are not shown by a figure.

Figure 6:
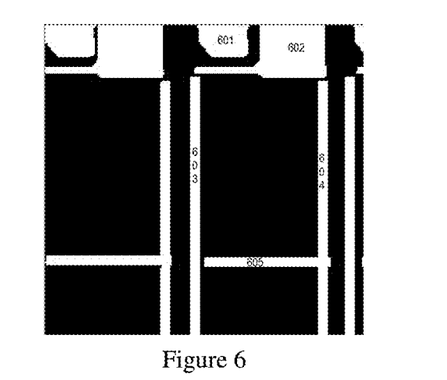
FIG. 6 shows an example of a binary image of a template image.
Figure 7A:
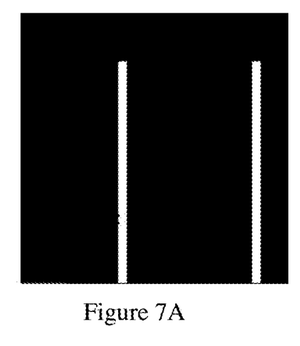
FIGS. 7A to 7E show examples of component masks decomposed from the binary image in FIG. 6.
Figure 7B:
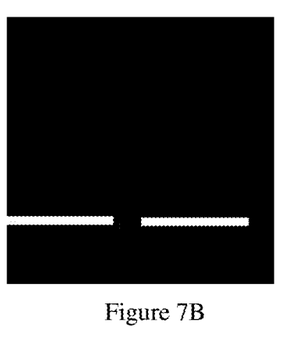
Figure 7C:
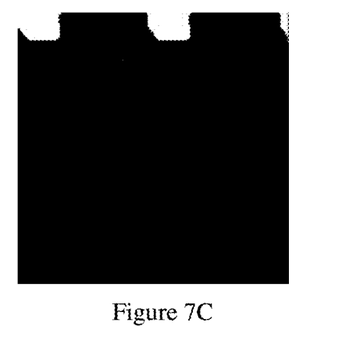
Figure 7D:
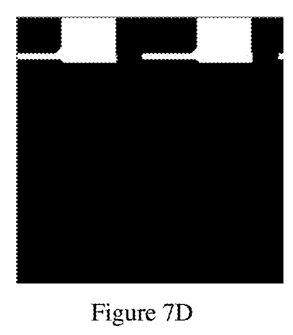
Figure 7E:
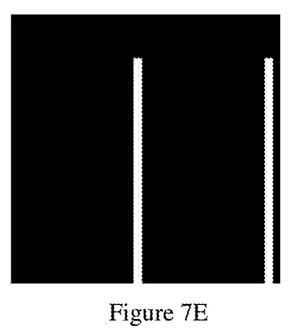

In other words, the topology relationship library includes binary images (i.e., components masks) containing components decomposed from a binary image of the template image. For example, FIG. 6 shows an example of a binary image of a template image. In one embodiment of the invention, the binary image can be generated automatically based on pixel color. In another embodiment of the invention, the binary image can be defined manually using a graphics software. FIGS. 7A to 7E show examples of component masks decomposed from the binary image in FIG. 6. Here, FIG. 7A shows a component mask including only component 604 and the same kind of component in FIG. 6; FIG. 7B shows a component mask including only component 605 and the same kind of component in FIG. 6; FIG. 7C shows a component mask including only component 601 and the same kind of component in FIG. 6; FIG. 7D shows a component mask including only component 602 and the same kind of component in FIG. 6; and FIG. 7E shows a component mask including only component 603 and the same kind of component in FIG. 6. In one embodiment of the invention, the component masks in FIGS. 7A to 7E make up a topology relationship library.

Referring back to step 340, the regional mask image is a region in its corresponding component mask that corresponds to the normal region. That is, in step 340, only region of interest (ROI) regions of these component masks are extracted as the at least one regional mask image. Each of the regional mask images corresponds to the normal region in the template image, which has the same size with its component masks. Thus, its corresponding regions in component masks can also be determined, which are regional mask images. In one embodiment of the present invention, the number of regional mask images is equal to the number of component masks. In another embodiment of the present invention, the number of regional mask images may be less than the number of component masks. For example, if a component is deemed as unimportant, or if a component is deemed as robust and thus immune to defects, component mask of this component can be ignored, and it is not necessary to extract a regional mask image from this component mask. This might cause the number of regional mask images being less than the number of component masks. By doing so, intensity of calculation can be reduced.

After forming the at least one regional mask image from the component masks, the method in FIG. 3 proceeds to step 350. In the abnormal connectivity determining step 350, at least one of connectivity relationship, connectivity type and connectivity scale of abnormal connectivity on the product can be determined based on calculations using the differential image and the at least one regional mask image. In one embodiment of the invention, determining the connectivity relationship may comprise determining the connectivity relationship among the defect and the components of the product. In one embodiment of the present invention, in the calculations using the differential image and the at least one regional mask images, a single object function may be used to determine at least one of connectivity relationship, connectivity type and connectivity scale of abnormal connectivity on the product.

In one embodiment of the invention, a first color in the differential image may be used to indicate the defect, and the first color in the at least one regional mask image may be used to indicate the components. In one embodiment of the present invention, the object function is equal to the number of pixels in the first color in the differential image plus the number of pixels in the first color in a regional mask image minus the number of pixels in the first color in an overlap image formed by overlapping the differential image and the regional mask image.

Figure 8A:
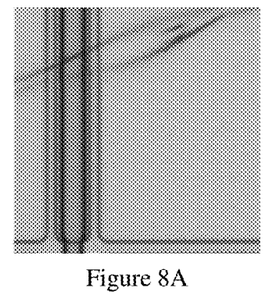
FIG. 8A shows an example of an inspection image.
Figure 8B:
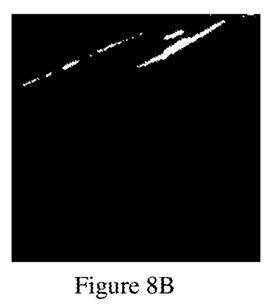
FIG. 8B shows a differential image of the inspection image in FIG. 8A.
Figure 8C:
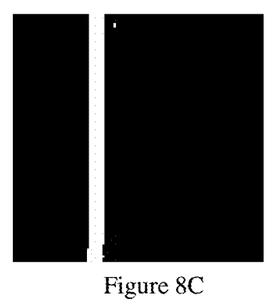
FIG. 8C shows a regional mask image from a component mask in a topology relationship library.
Figure 8D:
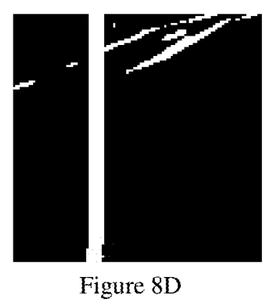
FIG. 8D shows an overlap image formed by overlapping the differential image in FIG. 8B and the regional mask image in FIG. 8C.

FIGS. 8A to 8D show an example of using such an object function to determine at least one of connectivity relationship, connectivity type and connectivity scale of abnormal connectivity on the product. FIG. 8A shows an example of an inspection image. FIG. 8B shows a differential image of the inspection image in FIG. 8A. FIG. 8C shows a regional mask image from a component mask in the topology relationship library, which is a normal region in the component mask corresponding to the inspection image. FIG. 8D shows an overlap image formed by overlapping the differential image in FIG. 8B and the regional mask image in FIG. 8C. In the overlap image, the overlapping is performed on a pixel-by-pixel basis. If both of the two pixels to be overlapped are black pixels, the resulting pixel is a black pixel; and if either of the two pixels to be overlapped is a white pixel, the resulting pixel is a white pixel. If the image in FIG. 8B is denoted as difROI, the image in FIG. 8C is denoted as maskROI, and the image in FIG. 8D is denoted as difMaskOverlap, the object function may be defined as:

$$F1=\text{sum}(\text{difROI})+\text{sum}(\text{maskROI})-\text{sum}(\text{difMaskOverlap})$$

Here, the function sum( ) is used to sum up white pixels of an image input to this function. Thus, in fact, the object function F1 is used to compare the sum of the number of white pixels in the differential image and the number of white pixels in the regional mask image with the number of white pixels in the overlap image. If the value of F1 is equal to zero, it means the defect in the differential image and the component in the regional mask image do not overlap. In this case, we can judge that there is not a connectivity relationship between the defect and the component. If the value of F1 is greater than zero, it means the defect in the differential image and the component in the regional mask image at least partially overlap. In this case, we can judge that there is a connectivity relationship between the defect and the component. For the case in FIGS. 8A to 8D, the value of F1 is greater than zero, thus it can be judged that, the defect in FIG. 8A is connected to the component shown in FIG. 8C.

In one embodiment of the invention, determining the connectivity relationship may further comprise determining whether two components are abnormally connected based on the connectivity relationship among the defect and the two components. By using the object function and the topology relationship library, we can judge if a defect has a connectivity relationship with each of components of a product respectively. For example, for the topology relationship shown in Table 1, if a defect is determined to have a connectivity relationship with the component M1-1 based on the object function as described above, and the defect is also determined to have a connectivity relationship with the component M1-3 based on the object function, then it can be determined that the components M1-1 and M1-3 are connected with each other, since both of the components M1-1 and M1-3 connect with the same defect. Thus, we can obtain the following detection connectivity relationship.

TABLE 2

|      | M1-1        | M1-2 | M1-3        | M1-4 | M1-5 | M1-6 |
|------|-------------|------|-------------|------|------|------|
| M1-1 |             |      | 1 (abnormal)|      |      |      |
| M1-2 |             |      | 1           | 1    | 1    |      |
| M1-3 | 1 (abnormal)| 1    |             |      |      | 1    |
| M1-4 |             | 1    |             |      |      | 1    |
| M1-5 |             | 1    |             |      |      | 1    |
| M1-6 |             |      | 1           | 1    | 1    |      |

Here, the cell (M1-1, M1-3) and the cell (M1-3, M1-1) in Table 2 are set to 1 to show that the defect causes an abnormal connectivity. Table 2 is only the result obtained after processing an inspection image as described above. If there are other inspection images from the same product, they should also be processed by using the method in FIG. 3. If there are any other abnormal connections, Table 2 can be further populated. When all of the inspection images from the product under inspection are processed, a resulting final connectivity relationship table can be compared with the table containing connectivity relationship of a normal product (e.g., Table 1) to identify all of the abnormal connectivity.

In one embodiment of the invention, the above object function can be also used to determine connectivity type of abnormal connectivity on the product. When an abnormal connectivity is determined to be present (for example, when the value of object function is greater than zero), a further determination can be made to determine connectivity type of the abnormal connectivity.

Figure 9A:
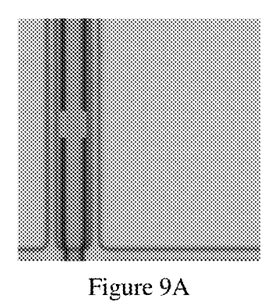
FIG. 9A shows an example of an inspection image.
Figure 9B:
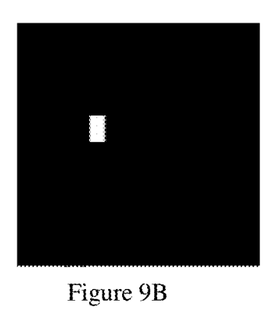
FIG. 9B shows a differential image of the inspection image in FIG. 9A.
Figure 9C:
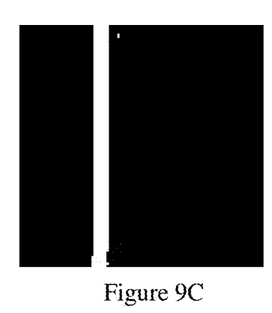
FIG. 9C shows a regional mask image from a component mask in the topology relationship library.
Figure 9D:
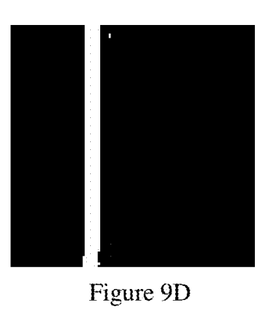
FIG. 9D shows an overlap image formed by overlapping the differential image in FIG. 9B and the regional mask image in FIG. 9C.

FIGS. 9A to 9D show an example of using an object function to determine at least one of connectivity relationship, connectivity type and connectivity scale of abnormal connectivity on the product. FIG. 9A shows an example of an inspection image. FIG. 9B shows a differential image of the inspection image in FIG. 9A. FIG. 9C shows a regional mask image from a component mask in the topology relationship library, which is a normal region in the component mask corresponding to the inspection image. FIG. 9D shows an overlap image formed by overlapping the differential image in FIG. 9B and the regional mask image in FIG. 9C. If the image in FIG. 9B is denoted as difROI1, the image in FIG. 9C is denoted as maskROI1, and the image in FIG. 9D is denoted as difMaskOverlap1, the object function may be defined as:

$$F2=\text{sum}(\text{difROI1})+\text{sum}(\text{maskROI1})-\text{sum}(\text{difMaskOverlap1})$$

Here, since the white block (i.e., defect) in FIG. 9B and the component in FIG. 9C overlap, F2 is greater than zero. That is, an abnormal connectivity is present. Then, a further determination is made such as:

if xrange(difMaskOverlap1)==xrange(maskROI1)

Here, the function xrange ( ) is used to obtain projection of white pixels in an input image on x-axis, which is a range on x-axis. In another embodiment, of course, the function may be replaced with yrange ( ), which is used to obtain projection of white pixels in an input image on y-axis. If the above determination returns true, it means that the range of defect does not go beyond the range of the component. Normally, it will not cause a short circuit and probably cause an open circuit. So, in this case, it can be determined that the connectivity type of the abnormal connectivity is an open circuit. If the above determination returns false, it means that the range of defect goes beyond the range of the component. Normally, it will not cause an open circuit and probably cause a short circuit.

Referring back to the examples in FIGS. 8A to 8D, in that case, if we judge the expression of xrange(difMaskOverlap)==xrange(maskROI), it will return false, since the range of defect goes beyond the range of the component (on the x-axis). So, in this case, it can be determined that the connectivity type of the abnormal connectivity is a short circuit.

Figure 10:
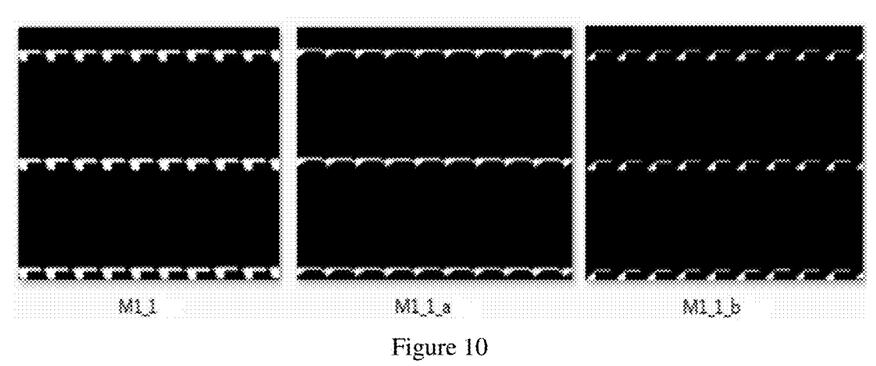
FIG. 10 shows an example of part component masks of a component according to an embodiment of the invention.

In one embodiment of the invention, the above object function can be also used to determine connectivity scale of abnormal connectivity on the product. Sometimes, for some component, an abnormal connectivity is determined to be present only if the defect overlaps with the component exceeding a certain width of the component, for example, half of the width of the component. By doing so, minor defects can be ignored. In one embodiment of the invention, the plurality of component masks may include part component masks, each of the part component masks contains a part of one kind of components of the product. FIG. 10 shows an example of part component masks of a component according to an embodiment of the invention. In FIG. 10, the image labeled with "M1_1" is component mask of the component M1-1, and the images labeled with "M1_1_a" and "M1_1_b" are part component masks, each of which contains a part of the component M1_1. That is, if the images labeled with "M1_1_a" and "M1_1_b" are overlapped, the image labeled with "M1_1" can be obtained. The part component masks can be obtained by manually dividing a component mask containing one kind of components in whole.

In one embodiment of the invention, determining the connectivity scale may include determining a defect as connecting with a component only if calculation using the differential image and regional mask images formed from part component masks of the component indicates that connectivity relationship is present among the defect and more than threshold number of parts of the component. Depending on standard of the inspection, components in a component mask can be divided into more than one part. That is to say, for this component, its component mask is used to form more than one-part component mask. In one embodiment of the invention, components in a component mask can be equally divided into more than one part.

For example, in the case where an abnormal connectivity is determined to be present only if the defect overlaps with the component exceeding half of the width of the component, the component mask of the component can be used to form two-part component masks (i.e., the component in the mask is divided into two parts). In this case, two reginal mask images are extracted from the two-part component masks, the two regional mask image are used with the differential image respectively to calculate the object function, and only if both of the two calculations show there are connectivity relationship between the defect and the two parts of the component, the defect is considered to connect with the component.

For example, in the case where an abnormal connectivity is determined to be present only if the defect overlaps with the component exceeding two thirds of the width of the component, the component mask of the component can be used to form three-part component masks (i.e., the component in the mask is divided into three parts). In this case, three reginal mask images are extracted from the three-part component masks, the three regional mask image are used with the differential image respectively to calculate the object function, and only if all of the three calculations show there are connectivity relationship between the defect and the three parts of the component, the defect is considered to connect with the component.

By using the part component masks according to the invention, an issue of measuring a scalar value is transformed into an issue of detecting topology. Thus, all of the three issues (i.e., connectivity relationship, connectivity type, and connectivity scale) can be solved at the same time based on evaluation of the same object function. With the present invention, flexible configuration can be achieved since an operator can form the topology relationship library and no expert is needed. During the automatic inspection, no supervision is needed. Since it is easy for the operator to form the topology relationship library, the system can be easily adapted to new layouts or new products. Additionally, with the present invention, a high accuracy of inspection can be achieved.

It should be noted that the processing of detecting abnormal connectivity on a product according to embodiments of this disclosure could be implemented by computer system/server 12 of FIG. 1.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for detecting abnormal connectivity on a manufactured product, the method comprising:
   receiving an inspection image of the manufactured product including at least one defect;
   matching the inspection image with a template image of the manufactured product to locate a corresponding normal region in the template image;
   obtaining a differential image between the inspection image and the normal region;
   forming at least one regional mask image from a plurality of component masks, wherein each of the plurality of component masks is a binary image of the template image with only one kind of components of the product remained, and the regional mask image is a region in its corresponding component mask that corresponds to the normal region; and
   determining, based on the differential image and the at least one regional mask image, at least one of: connectivity relationship, connectivity type and connectivity scale of abnormal connectivity on the manufactured product.

2. The method according to claim 1, wherein determining the connectivity relationship comprises determining the connectivity relationship among the defect and the components of the manufactured product, the manufactured product including at least an electronic product, a semiconductor product or a liquid crystal display (LCD) product.

3. The method according to claim 1, wherein determining the connectivity relationship further comprises determining whether two components are abnormally connected based on the connectivity relationship among the defect and the two components.

4. The method according to claim 1, wherein a single object function is used in a calculation using the differential image and the at least one regional mask image to determine at least one of: connectivity relationship, connectivity type and connectivity scale of abnormal connectivity on the product.

5. The method according to claim 4,
   wherein the differential image is a binary image, and a first color in the differential image is used to indicate the defect, and the first color in the at least one regional mask image is used to indicate the components; and
   wherein the object function is equal to the number of pixels in the first color in the differential image plus the number of pixels in the first color in a regional mask image minus the number of pixels in the first color in an overlap image formed by overlapping the differential image and the regional mask image.

6. The method according to claim 1, wherein the plurality of component masks further includes part component masks, each of the part component masks includes a part of one kind of components of the product.

7. The method according to claim 6, wherein determining the connectivity scale further comprises determining a defect as connecting with a component only if calculation using the differential image and regional mask images formed from part component masks of the component indicates that connectivity relationship is present among the defect and more than threshold number of parts of the component.

8. A system for detecting abnormal connectivity on a manufactured product, the system comprising:
   one or more processors;
   a memory coupled to at least one of the one or more processors;
   a set of computer program instructions stored in the memory and executed by at least one of the one or more processors to perform actions of:
      receiving an inspection image of the manufactured product including at least one defect;

matching the inspection image with a template image of the manufactured product to locate a corresponding normal region in the template image;

obtaining a differential image between the inspection image and the normal region;

forming at least one regional mask image from a plurality of component masks, wherein each of the plurality of component masks is a binary image of the template image with only one kind of components of the product remained, and the regional mask image is a region in its corresponding component mask that corresponds to the normal region; and determining, based on calculation using the differential image and the at least one regional mask image, at least one of: connectivity relationship, connectivity type and connectivity scale of abnormal connectivity on the manufactured product.

9. The system according to claim 8, wherein determining the connectivity relationship comprising determining the connectivity relationship among the defect and the components of the manufactured product, the manufactured product including at least an electronic product, a semiconductor product or a liquid crystal display (LCD) product.

10. The system according to claim 8, wherein determining the connectivity relationship further comprises determining whether two components are abnormally connected based on the connectivity relationship among the defect and the two components.

11. The system according to claim 8, wherein a single object function is used in the calculation using the differential image and the at least one regional mask image to determine at least one of: connectivity relationship, connectivity type and connectivity scale of abnormal connectivity on the product.

12. The system according to claim 11,
wherein the differential image is a binary image, and a first color in the differential image is used to indicate the defect, and the first color in the at least one regional mask image is used to indicate the components; and
wherein the object function is equal to the number of pixels in the first color in the differential image plus the number of pixels in the first color in a regional mask image minus the number of pixels in the first color in an overlap image formed by overlapping the differential image and the regional mask image.

13. The system according to claim 8, wherein the plurality of component masks further includes part component masks, each of the part component masks contains a part of one kind of components of the product.

14. The system according to claim 13, wherein determining the connectivity scale comprising determining a defect as connecting with a component only if calculation using the differential image and regional mask images formed from part component masks of the component indicates that connectivity relationship is present among the defect and more than threshold number of parts of the component.

15. A non-transitory computer program product for detecting abnormal connectivity on a manufactured product, the computer program product comprising a computer readable storage medium having program instructions embodied therewith, wherein the program instructions being executable by a device to cause the device to perform a method comprising:

receiving an inspection image of the manufactured product including at least one defect;

matching the inspection image with a template image of the manufactured product to locate a corresponding normal region in the template image;

obtaining a differential image between the inspection image and the normal region;

forming at least one regional mask image from a plurality of component masks, wherein each of the plurality of component masks is a binary image of the template image with only one kind of components of the product remained, and the regional mask image is a region in its corresponding component mask that corresponds to the normal region; and determining, based on calculation using the differential image and the at least one regional mask image, at least one of: connectivity relationship, connectivity type and connectivity scale of abnormal connectivity on the manufactured product.

16. The non-transitory computer program product according to claim 15, wherein determining the connectivity relationship comprising determining whether two components are abnormally connected based on the connectivity relationship among the defect and the two components.

17. The non-transitory computer program product according to claim 15, wherein a single object function is used in the calculation using the differential image and the at least one regional mask image to determine at least one of: connectivity relationship, connectivity type and connectivity scale of abnormal connectivity on the product.

18. The non-transitory computer program product according to claim 17,
wherein the differential image is a binary image, and a first color in the differential image is used to indicate the defect, and the first color in the at least one regional mask image is used to indicate the components; and
wherein the object function is equal to the number of pixels in the first color in the differential image plus the number of pixels in the first color in a regional mask image minus the number of pixels in the first color in an overlap image formed by overlapping the differential image and the regional mask image.

19. The non-transitory computer program product according to claim 15, wherein the plurality of component masks further includes part component masks, each of the part component masks contains a part of one kind of components of the product.

20. The non-transitory computer program product according to claim 19, wherein determining the connectivity scale comprising determining a defect as connecting with a component only if calculation using the differential image and regional mask images formed from part component masks of the component indicates that connectivity relationship is present among the defect and more than threshold number of parts of the component.

* * * * *